United States Patent
Golling

(10) Patent No.: US 12,202,565 B2
(45) Date of Patent: Jan. 21, 2025

(54) FIXING DEVICE FOR DETACHABLY FIXING A BODY TO A MOTOR VEHICLE, AND LUGGAGE-CARRYING DEVICE

(71) Applicant: Bayerische Motoren Werke Aktiengesellschaft, Munich (DE)

(72) Inventor: Adrian Golling, Groebenzell (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 736 days.

(21) Appl. No.: 17/252,895

(22) PCT Filed: Jun. 11, 2019

(86) PCT No.: PCT/EP2019/065198
§ 371 (c)(1),
(2) Date: Dec. 16, 2020

(87) PCT Pub. No.: WO2020/001973
PCT Pub. Date: Jan. 2, 2020

(65) Prior Publication Data
US 2021/0261213 A1    Aug. 26, 2021

(30) Foreign Application Priority Data
Jun. 28, 2018   (DE) ..................... 10 2018 210 353.4

(51) Int. Cl.
*B62J 11/19* (2020.01)
*B62J 9/00* (2020.01)
(Continued)

(52) U.S. Cl.
CPC ................. *B62J 9/20* (2020.02); *B62J 11/19* (2020.02); *H01R 13/627* (2013.01); *B62J 9/00* (2013.01)

(58) Field of Classification Search
CPC .......................... H01R 13/6271; B62J 9/20–40
(Continued)

(56) References Cited

U.S. PATENT DOCUMENTS 3,944,924 A * 3/1976 Miyachi ................. H05K 11/02
455/90.3
4,907,984 A * 3/1990 Keller ................. H01R 13/6392
24/581.1
(Continued)

FOREIGN PATENT DOCUMENTS

| CN | 1463479 A | 12/2003 |
|---|---|---|
| CN | 101823524 A | 9/2010 |

(Continued)

OTHER PUBLICATIONS

International Search Report (PCT/ISA/210) issued in PCT Application No. PCT/EP2019/065198 dated Sep. 19, 2019 with English translation (six (6) pages).
(Continued)

*Primary Examiner* — Justin M Larson
(74) *Attorney, Agent, or Firm* — Crowell & Moring LLP

(57) ABSTRACT

A fixing device for detachably fixing a body to a vehicle, such as a tilting vehicle, includes: at least one first fixing device which can be fixed or is fixed to the body; at least one second fixing device which can be fixed or is fixed to a load-bearing vehicle component of the motor vehicle and which is detachably joined to the first fixing device in a coupled arrangement in order to fix the body to the vehicle component; and at least one electrical line which can be guided from the vehicle component to the body and can be fixed to the body in order to supply an electrical load. The fixing device is characterized in that the first fixing device has a first conductor of the electrical line and the second fixing device has a second conductor of the electrical line. The first conductor and the second conductor can be elec- (Continued)

trically conductively connected or are electrically conductively connected to one another in the coupled arrangement of the fixing devices.

12 Claims, 3 Drawing Sheets

(51) Int. Cl.
  *B62J 9/20* (2020.01)
  *H01R 13/627* (2006.01)
(58) Field of Classification Search
  USPC .................................. 224/328, 413
  See application file for complete search history.

(56) References Cited

U.S. PATENT DOCUMENTS

| | | | | |
|---|---|---|---|---|
| 4,917,625 A * | 4/1990 | Haile | ................ | H01R 13/639 |
| | | | | 439/271 |
| 5,069,634 A * | 12/1991 | Chiarolanzio | ..... | H01R 13/6273 |
| | | | | 439/373 |
| 5,306,156 A * | 4/1994 | Gibbs | ................ | H01R 13/639 |
| | | | | 224/315 |
| 5,431,570 A * | 7/1995 | Gibbs | ................ | B62D 35/007 |
| | | | | 29/854 |
| 5,454,729 A * | 10/1995 | Wen-Te | ............ | H01R 13/6273 |
| | | | | 439/357 |
| 5,624,266 A * | 4/1997 | Gibbs | ................ | H01R 13/629 |
| | | | | 224/315 |
| 6,305,590 B1 | 10/2001 | Hayes | | |
| 6,767,218 B2 * | 7/2004 | Marmaropoulos | ........................ | |
| | | | | H01R 13/6271 |
| | | | | 280/801.1 |
| 6,783,040 B2 * | 8/2004 | Batchelor | ................ | B62J 9/25 |
| | | | | 224/406 |
| 6,863,539 B2 * | 3/2005 | Marmaropoulos | ........................ | |
| | | | | H01R 13/6271 |
| | | | | 280/801.1 |
| 9,614,332 B2 * | 4/2017 | Curtin | ................ | H01R 13/665 |
| 11,623,580 B2 * | 4/2023 | Treptow | ................ | B60R 9/055 |
| | | | | 224/328 |

| | | | |
|---|---|---|---|
| 2002/0146917 A1 | 10/2002 | Marmaropoulos | |
| 2004/0040992 A1 | 3/2004 | Batchelor | |
| 2004/0262350 A1 | 12/2004 | Batchelor | |
| 2005/0014408 A1 | 1/2005 | Swiatek et al. | |
| 2014/0113474 A1 | 4/2014 | Eckel et al. | |
| 2015/0004809 A1 | 1/2015 | Liskow | |
| 2015/0318637 A1 | 11/2015 | Griepenstroh et al. | |
| 2016/0015132 A1 | 1/2016 | Curtin et al. | |
| 2017/0279217 A1 | 9/2017 | Wimmer et al. | |
| 2021/0261213 A1 * | 8/2021 | Golling | .................... B62J 11/19 |

FOREIGN PATENT DOCUMENTS

| | | | |
|---|---|---|---|
| CN | 103797654 A | 5/2014 | |
| CN | 104025386 A | 9/2014 | |
| CN | 104904071 A | 9/2015 | |
| CN | 106953196 A | 7/2017 | |
| CN | 107585239 A | 1/2018 | |
| DE | 101 37 036 A1 | 2/2003 | |
| DE | 102 12 222 A1 | 10/2003 | |
| DE | 10 2009 024 156 A1 | 12/2010 | |
| DE | 20 2013 002 458 U1 | 6/2013 | |
| DE | 10 2013 226 457 A1 | 6/2015 | |
| DE | 102016006555 A1 * | 2/2017 | |
| DE | 10 2016 007 317 A1 | 12/2017 | |
| EP | 1 813 516 A1 | 8/2007 | |
| JP | 2015-30437 A | 2/2015 | |

OTHER PUBLICATIONS

German-language Written Opinion (PCT/ISA/237) issued in PCT Application No. PCT/EP2019/065198 dated Sep. 19, 2019 (five (5) pages).

German-Language Search Report issued in German Application No. 10 2018 210 353.4 dated May 8, 2019 with partial English Translation (14 pages).

Chinese-language Office Action issued in Chinese Application No. 201980035421.9 dated Feb. 17, 2022 with English translation (16 pages).

Chinese-language Office Action issued in Chinese Application No. 201980035421.9 dated Jul. 13, 2021 with English translation (20 pages).

* cited by examiner

FIXING DEVICE FOR DETACHABLY FIXING A BODY TO A MOTOR VEHICLE, AND LUGGAGE-CARRYING DEVICE

BACKGROUND AND SUMMARY OF THE INVENTION

The invention relates to a fixing device for detachably fixing a body to a motor vehicle, such as a tilting vehicle, comprising at least one first fixing device which can be fixed or is fixed to the body, at least one second fixing device which can be fixed or is fixed to a load-bearing vehicle component of the motor vehicle and which is detachably joined to the first fixing device in a coupled arrangement in order to fix the body to the vehicle component, and comprising at least one electrical line which can be guided from the vehicle component to the body and can be fixed to the body in order to supply an electrical load.

It is known to fix bodies, for example luggage containers, to motor vehicles. Objects kept outside a vehicle housing can be stored in the respective body. This proves to be advantageous in particular when the motor vehicle comprises a tilting vehicle, in which there is little stowage space for the transport of objects in the vehicle housing of the tilting vehicle.

Furthermore, it is known to guide an electrical line from the vehicle component of the motor vehicle to the body in order to supply an electrical load arranged there with electrical energy. Here, the electrical load can comprise, for example, a mobile radio device, a navigation device or the like.

The electrical line which is guided from the vehicle component to the body must be joined and detached again manually by the driver of the motor vehicle during each use, which has proven to be time-consuming and cumbersome.

An object of an exemplary embodiment of the invention is to propose a fixing device in which the production of an electrical line between the vehicle component and the body is made easier.

In a fixing device of the type mentioned at the beginning, this object is achieved in that the first fixing device comprises a first conductor of the electrical line and the second fixing device comprises a second conductor of the electrical line, wherein the first conductor and the second conductor can be electrically conductively connected or are electrically conductively connected to one another in the coupled arrangement of the fixing means.

Since the first fixing device comprises a first conductor and the second fixing device comprises a second conductor, the electrical line from the vehicle component to the body is produced automatically and in a simple way when the first fixing device is coupled to the second fixing device.

The vehicle component can, for example, comprise a vehicle housing, a steering unit or a cladding of the motor vehicle.

A tilting vehicle is understood to be bicycles, motorcycles or motor vehicles similar to motorcycles, such as motor scooters, in particular two-wheeled, three-wheeled or four-wheeled motor scooters, scooters, tiltable trikes, quad bikes or the like.

It proves to be advantageous if the first conductor and the second conductor are cable-like and/or formed as components that are separate or can be separated from the first fixing device and the second fixing device, and/or in that the first conductor and the first fixing device and/or the second conductor and the second fixing device each comprise a common component.

If the first conductor and the second conductor of cable-like form and are formed as separate components with respect to the first fixing device and the second fixing device, the first conductor and the first fixing device can be preassembled, detachably or non-detachably joined to each other. The same is true of the second conductor and the second fixing device.

If the first conductor and the first fixing device and also the second conductor and the second fixing device each comprise a common component, the conduction can be implemented by the material of the fixing means. In such a case, the first conductor and/or the second conductor can, for example, be woven into a textile if the first fixing device and/or the second fixing device comprise such a textile.

Furthermore, it proves to be advantageous if the first fixing device comprises at least one section that can be bent flexibly transversely to the longitudinal direction, which is rigid or elastically deformable in the longitudinal direction, and/or the second fixing device comprises at least one section that can be bent flexibly transversely to the longitudinal direction, which is rigid or elastically deformable in the longitudinal direction.

In such a case, the fixing device can readily be adapted to different geometries of the vehicle component.

The first fixing device and/or the second fixing device can as a whole be formed from the section that can be bent flexibly in the longitudinal direction or comprise only some sections in the longitudinal direction of the section that can be bent flexibly transversely to the longitudinal direction.

In order to make it easier to couple or fix the first fixing device and the second fixing device to each other, it proves to be advantageous if the first fixing device comprises a mechanical first coupling element at its end facing the second fixing device, to which coupling element the second fixing device can be fixed detachably by a second coupling element, which is arranged at that end of the second coupling element which faces the first coupling element.

The first coupling element and the second coupling element can in principle be formed in any desired way, provided that they fulfill the function that the first fixing device is fixed to the second fixing device in the joined arrangement. The first coupling element and the second coupling element can be produced simply and economically if the first coupling element comprises at least one snap-in member which, as the second coupling element is joined to the first coupling element, is movable transversely or obliquely with respect to the joining direction and, in the coupled arrangement, can be latched into at least one recess in the second coupling element, transversely or obliquely with respect to the joining direction, and forms a catch counter to the joining direction.

In such a case, the first coupling element and the second coupling element are clipped to each other.

In an embodiment of the fixing device, provision is made for the first coupling element to comprise a first contact section of the first conductor and/or the second coupling element to comprise a second contact section of the second conductor which, in the joined arrangement of the fixing means, are joined to each other so as to make contact.

In such a case, it is simply possible to ensure that the first conducting section is connected to the second conducting section as soon as the first coupling element is latched to the second coupling element.

Furthermore, the first coupling element and/or the second coupling element can comprise at least one tensioning means, in order to be able to tension the first fixing device and/or the second fixing device. In this way, movement of the body can be reduced as a result of the application of a tensioning force.

In order to prevent penetration of dirt or moisture to the first conductor or the second conductor, it proves to be advantageous if the fixing device comprises at least one first sealing means which, at least in the non-joined arrangement of the two conducting means, seals off the first conductor, in particular the first contact section, and/or if the fixing device comprises at least one second sealing means which, at least in the non-joined arrangement of the two conducting means, seals off the second conductor, in particular the second contact section.

Here, the first sealing means and the second sealing means can be of any desired design if they fulfill the function of keeping dirt and/or moisture away from the first contact section and the second contact section.

The first sealing means and/or the second sealing means can be produced simply and economically if the first sealing means and/or the second sealing means are fixed detachably or non-detachably to the first fixing device and to the second fixing device and, in particular, is formed in the manner of a cover.

The fixing device can be produced compactly and economically if the first contact section, the first coupling element, the at least one snap-in member of the first coupling element and/or the first sealing means comprise a common component, in particular an injection-molded part, and/or in that the second contact section, the second coupling element, the at least one snap-in member of the second coupling element and/or the second sealing means comprise a common component, in particular an injection-molded part.

Furthermore, the object is achieved by a luggage-carrying device for arrangement on a motor vehicle, a tilting vehicle, comprising at least one luggage container and comprising at least one fixing device, in particular comprising at least one of the aforementioned features for detachably fixing the body formed as a luggage container to the motor vehicle, the at least one first fixing device, which can be fixed or is fixed to the body, the at least one second fixing device, which can be fixed or is fixed to a load-bearing vehicle component of the motor vehicle, and which is detachably joined to the first fixing device in a coupled arrangement, in order to fix the body to the vehicle component, and the at least one electrical line, which can be guided from the vehicle component to the body and can be fixed to the body to supply an electrical load. The luggage-carrying device is characterized in that the first fixing device comprises a first conductor of the electrical line and the second fixing device comprises a second conductor of the electrical line, wherein the first conductor and the second conductor can be electrically conductively connected or are electrically conductively connected to one another in the coupled arrangement of the fixing means.

Further features, details and advantages of the invention can be gathered from the appended patent claims, from the graphical illustration and the following description of a preferred embodiment of the fixing device and of the luggage-carrying device.

DETAILED DESCRIPTION OF THE DRAWINGS

Figure 1:
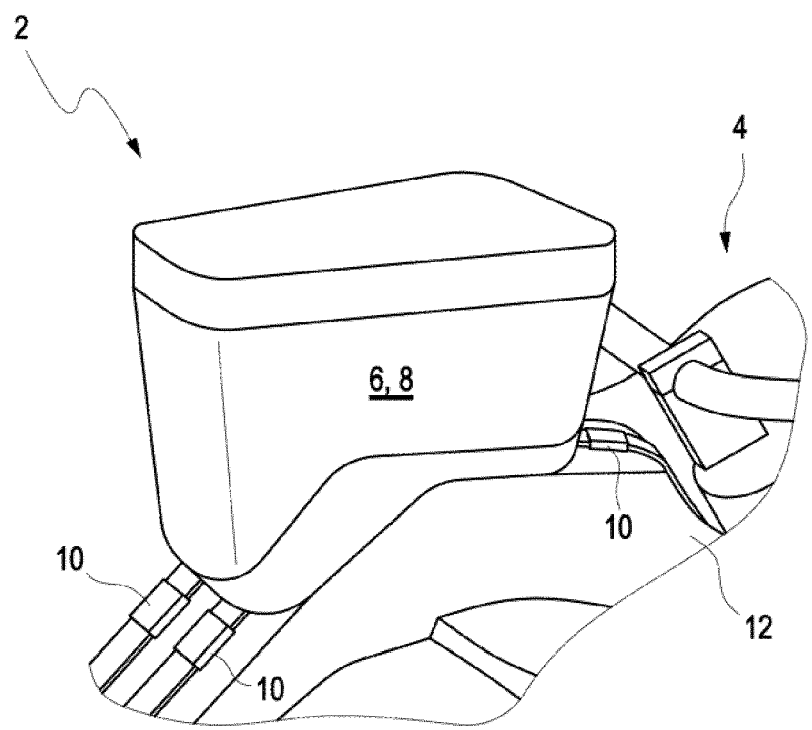
FIG. 1 is a perspective side view of a luggage-carrying device with a fixing device.

FIG. 1 shows a luggage-carrying device, provided overall with the designation 2, which can be arranged on a motor vehicle 4. The luggage-carrying device 2 comprises a body 8 which is formed as a luggage container 6 and which can be fixed to a vehicle component 12 of the motor vehicle 4 by at least one fixing device 10.

FIG. 1 shows an exemplary embodiment of the luggage-carrying device 2 in which the luggage-carrying device 2 comprises a total of three fixing devices 10.

An embodiment of the fixing device 10 will now be discussed by using FIGS. 2 to 5.

Figure 2:
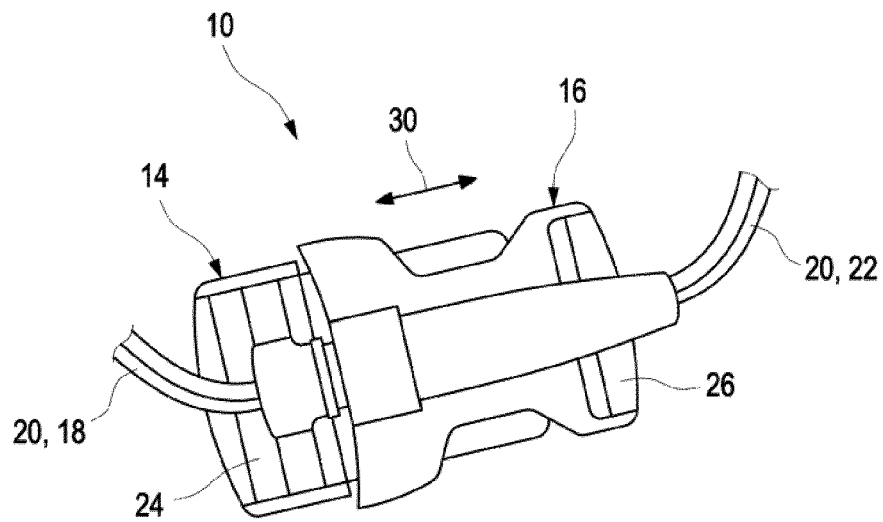
FIG. 2 is a plan view of an exemplary embodiment of the fixing device.

FIG. 2 shows a fixing device 10 in a joined arrangement. In the latter, a first fixing device 14 is fixed to a second fixing device 16 in a coupled manner. Furthermore, a first conductor 18 of an electrical line 20 is integrated into the first fixing device 14. A second conductor 22 of the line 20 is integrated into the second fixing device 18.

FIG. 2 shows an exemplary embodiment of the fixing device 10 in which the first fixing device 14 and the second fixing device 16 comprise a section that can be bent flexibly transversely to its longitudinal direction. The first fixing device 14 comprises a first coupling element 24, to which the second fixing device 16 can be fixed detachably by a second coupling element 26. For this purpose, the first coupling element 24 of the first fixing device 14 in the exemplary embodiment 2 that can be seen in the figures comprises snap-in members 28, which are movable transversely to the joining direction 30 and, in the coupled arrangement, can engage in at least one recess 32 of the second coupling element 26 counter to the joining direction 30, forming a catch.

Furthermore, the first coupling element 24 comprises a first contact section 34 of the first conductor 18 which, in the joined arrangement of the fixing means 14, 16, is joined to a second contact section 36 of the second conductor 22 so as to make contact. The electrical line 20 is formed in this way.

Figure 3:
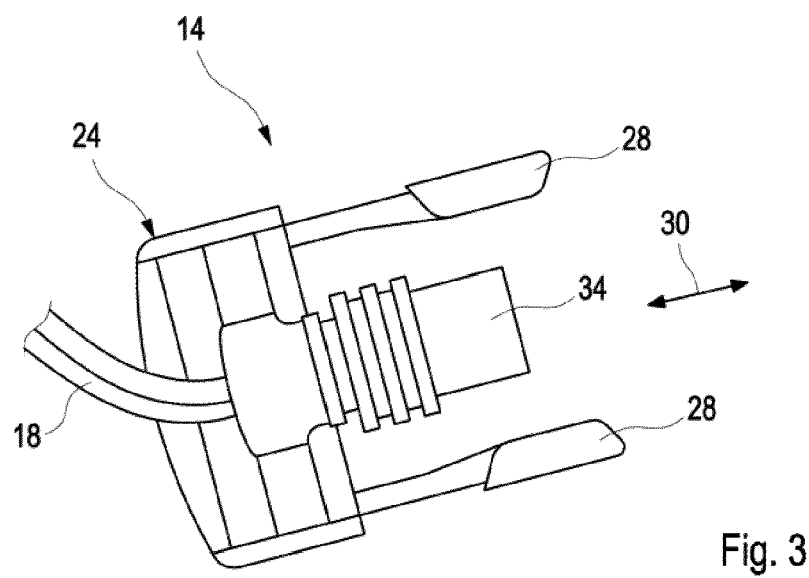
FIG. 3 is a detailed plan view of a first coupling element of the fixing device.

FIG. 3 shows a detailed view of the first coupling element 24 with its two snap-in members 28 and the first contact section 34.

Figure 4:
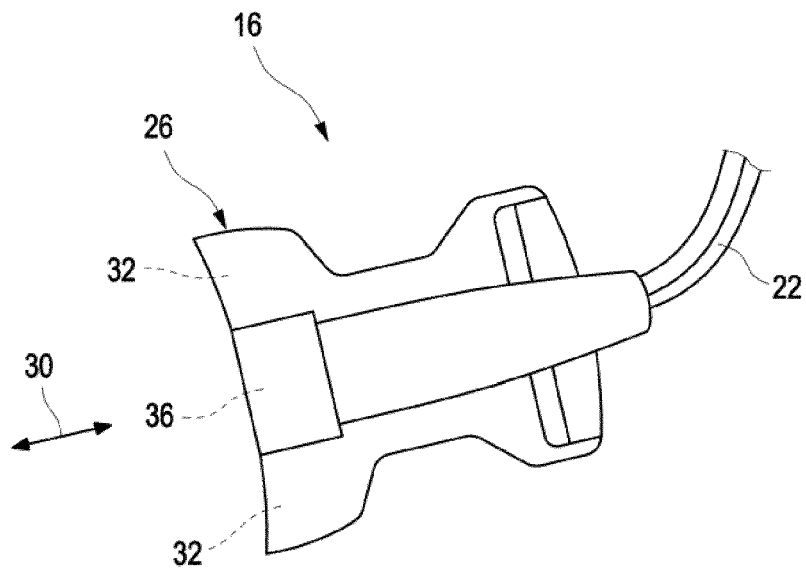
FIG. 4 is a detailed plan view of a second coupling element of the fixing device.

FIG. 4 shows a detailed view of the second coupling element 26 having the two recesses 32, into which the snap-in members 28 of the first coupling element 24 can be latched in the joined arrangement, and having the second contact section 36 of the second conductor 22.

Figure 5:
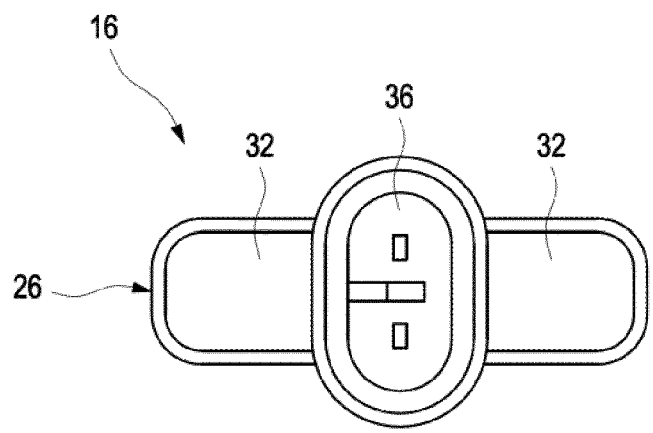
FIG. 5 shows a plan view of the second coupling element according to FIG. 4.

FIG. 5 shows a plan view of the exemplary embodiment of the second coupling element 26 according to FIG. 4.

The action of the fixing device 10 and the luggage-carrying device 2 will be explained briefly below.

When arranging a body 8 formed as a luggage container 6 on a vehicle component 12 of the motor vehicle 4, the first fixing device 14 fixed to the body 8 is fixed to the second fixing device 16 connected to the vehicle component 12. In this way, the body 8 formed as a luggage container 6 is fixed to the motor vehicle 4.

At the same time as the first fixing device 14 is joined to the second fixing device 16, the first conductor 18 is electrically connected to the second conductor 22, which means that the two conducting means 18, 22 form the electrical line 20. By means of the electrical line 20, an electrical load arranged in the body 8 formed as a luggage container 6 can be connected to an electrical energy source arranged in the motor vehicle 4 and supplied with electrical energy.

The features of the invention disclosed in the above description, in the claims and in the drawing can be essential both individually and also in any desired combination in the implementation of the invention in its various embodiments.

LIST OF DESIGNATIONS

2 Luggage-carrying device
4 Motor vehicle
6 Luggage container
8 Body
10 Fixing device
12 Vehicle components
14 First fixing device
16 Second fixing device
18 First conductor
20 Electrical line
22 Second conductor
24 First coupling element
26 Second coupling element
28 Snap-in member
30 Joining direction
32 Recess
34 First contact section
36 Second contact section

What is claimed is:

1. An apparatus comprising:
at least one fixing device that includes at least one first fixing half and at least one second fixing half, wherein the at least one first fixing half is fixed to a luggage container, and the at least one second fixing half is fixed to a load-bearing vehicle component of a motor vehicle and which is detachably joined to the first fixing half in a coupled arrangement in order to fix the luggage container to the vehicle component; and
at least one electrical line which is guided from the vehicle component to the luggage container and is fixed to the luggage container in order to supply an electrical load, wherein
the first fixing half comprises a first conductor of the electrical line and the second fixing half comprises a second conductor of the electrical line, and
the first conductor and the second conductor are electrically conductively connectable or are electrically conductively connected to one another in the coupled arrangement of the first and second fixing devices, wherein
the first fixing half includes a first coupling element, and the second fixing half includes a second coupling element,
the first coupling element comprises a snap-in member, which is configured to join the second coupling element to the first coupling element,
the snap-in member being movable across the wire at an angle to the joining direction,
the snap-in member being configured to fit into a recess of the second coupling element, at which location the snap-in member is snapped transversely or obliquely to the joining direction,
an end of the first fixing half forms a rear grip and accommodates therein the first conductor of the electrical line, and
the luggage container is fixed to the motor vehicle exclusively via the at least one fixing device.

2. The apparatus according to claim 1, wherein
the first conductor and the second conductor are cables and are formed as components that are separate or can be separated from the first fixing device half and the second fixing half, or
the first conductor and the first fixing half or the second conductor and the second fixing half each comprise a common component.

3. The apparatus according to claim 1, wherein
the first fixing half comprises at least one section that can be bent flexibly transversely to the longitudinal direction, which is rigid or elastically deformable in the longitudinal direction, or
the second fixing half comprises at least one section that can be bent flexibly transversely to the longitudinal direction, which is rigid or elastically deformable in the longitudinal direction.

4. The apparatus according to claim 1, wherein
the first fixing half comprises a mechanical first coupling element at its end facing the second fixing device, to which mechanical first coupling element the second fixing half is detachably fixed by a second coupling element, which is arranged at that end of the second coupling element which faces the first coupling element.

5. The apparatus according to claim 1, wherein
the at least one fixing device detachably fixes the luggage container to a tilting vehicle.

6. The apparatus according to claim 1, wherein
the first coupling element comprises a first contact section of the first conductor and the second coupling element comprises a second contact section of the second conductor, which, in the coupled arrangement of the first and second fixing devices halves are joined to one another so as to make contact.

7. The apparatus according to claim 6, further comprising:
at least one first seal which, is configured to seal off the first conductor, or
at least one second seal which, is configured to seal off the second conductor.

8. The apparatus according to claim 7, wherein
the at least one first seal seals off the first contact section; or
the at least one second seal seals off the second contact section.

9. The apparatus according to claim 7, wherein
the first seal or the second seal is fixed detachably or non-detachably to the first fixing half and to the second fixing half.

10. The apparatus according to claim 7, wherein
the first contact section, the first coupling element, and the at least one snap-in member of the first coupling element comprise a common component or
the second contact section, the second coupling element, and the at least one snap-in member of the second coupling element comprise a common component.

11. The apparatus according to claim 10, wherein
the common component is an injection/molded part.

12. A luggage-carrying device for arrangement on a motor vehicle, comprising:
a luggage container;
a load-bearing vehicle component of the motor vehicle on which the luggage container is arranged;
at least one first fixing device, wherein the at least one fixing device includes a first fixing half that is fixed to the luggage container, and a second fixing half that is fixed to the load-bearing vehicle component of the motor vehicle, the first and second fixing halves are couplable to one another in order to fix the luggage container to the load-bearing vehicle component, the first fixing half comprises a first conductor of an electrical line guidable from the vehicle component to the luggage container, the second fixing half comprising a second conductor of the electrical line, the first conductor and the second conductor are electrically conductively connected to one another in a coupled arrangement of the first and second fixing-devices halves, wherein the first fixing half includes a first coupling element, and the second fixing device half includes a second coupling element, the first coupling element comprises a snap-in member, which is configured to join the second coupling element to the first coupling element, the snap-in member being movable across the wire at an angle to the joining direction, the snap-in member being configured to fit into a recess of the second coupling element, at which location the snap-in member is snapped transversely or obliquely to the joining direction, an end of the first fixing half forms a rear grip and accommodates therein the first conductor of the electrical line, and the luggage container is fixed to the motor vehicle exclusively via the at least one fixing device.

* * * * *